United States Patent [19]

Zhong

[11] Patent Number: 4,642,214
[45] Date of Patent: Feb. 10, 1987

[54] NUCLEAR PEBBLE BED REACTOR WITH INHERENT PASSIVE STABILIZATION IN THE EVENT OF DAMAGE

[75] Inventor: Wang D. Zhong, Julich, Fed. Rep. of Germany

[73] Assignee: Kernforschungsanlage Julich Gesellschaft mit beschrankter Haftung, Julich, Fed. Rep. of Germany

[21] Appl. No.: 449,194

[22] Filed: Dec. 13, 1982

[30] Foreign Application Priority Data

Dec. 16, 1981 [DE] Fed. Rep. of Germany ....... 3149794

[51] Int. Cl.[4] .............................................. G21C 7/06
[52] U.S. Cl. .................................. 376/221; 376/265; 376/338; 376/381
[58] Field of Search ............... 376/381, 382, 265, 458, 376/459, 221, 338, 355

[56] References Cited

U.S. PATENT DOCUMENTS

| 2,975,116 | 3/1961 | Daniels | 376/265 |
|---|---|---|---|
| 3,034,689 | 5/1962 | Stoughton et al. | 376/265 |
| 3,228,852 | 1/1966 | Holmes et al. | 376/265 |
| 3,244,597 | 4/1966 | Tower | 376/265 |
| 3,287,910 | 11/1966 | Silverstein | 376/338 |
| 3,297,538 | 1/1967 | Grumm et al. | 376/265 |
| 3,321,376 | 5/1967 | Machnig et al. | 376/381 |
| 3,321,378 | 5/1967 | Thomson | 376/381 |
| 3,960,656 | 6/1976 | Lohnert et al. | 376/265 |
| 4,234,384 | 11/1980 | Fritz et al. | 376/381 |
| 4,243,487 | 1/1981 | Schweiger | 376/381 |
| 4,257,845 | 3/1981 | Lukaszewicz et al. | 376/381 |
| 4,312,704 | 1/1982 | Schror et al. | 376/265 |
| 4,356,145 | 10/1982 | Brandes et al. | 376/381 |
| 4,372,912 | 2/1983 | von der Decken et al. | 376/381 |

FOREIGN PATENT DOCUMENTS

| 633107 | 12/1961 | Canada | 376/355 |
|---|---|---|---|
| 675117 | 12/1963 | Canada | 376/265 |
| 3030510 | 3/1982 | Fed. Rep. of Germany | 376/381 |
| 3042552 | 6/1982 | Fed. Rep. of Germany | 376/381 |
| 3047922 | 7/1982 | Fed. Rep. of Germany | 376/381 |
| 3047682 | 7/1982 | Fed. Rep. of Germany | 376/381 |
| 1428929 | 1/1966 | France | 376/265 |
| 59221 | 9/1969 | Luxembourg . | |
| 821607 | 10/1959 | United Kingdom | 376/265 |

Primary Examiner—Salvatore Cangialosi
Attorney, Agent, or Firm—Scully, Scott, Murphy & Presser

[57] ABSTRACT

A high-temperature nuclear reactor having spherical fuel elements which are arranged approximately ring-shaped about a graphite core, and in particular, a massed-sphere nuclear reactor providing for inherent passive stabilization in the event of damage. The inventive high-temperature reactor of the above-mentioned type distinguishes itself in that the graphite core is formed by a pile or mass of graphite spheres. Through the intermediary of such an axial graphite sphere region, the maximum temperature of the fuel elements of the core can be limited in the event of encountered damage in a manner similar to that as would be the case for a compact graphite column.

3 Claims, 4 Drawing Figures

NUCLEAR PEBBLE BED REACTOR WITH INHERENT PASSIVE STABILIZATION IN THE EVENT OF DAMAGE

BACKGROUND OF THE INVENTION

1. Field of the Invention

The present invention relates to a high-temperature nuclear reactor having spherical fuel elements which are arranged approximately ring-shaped about a graphite core, and in particular, relates to a nuclear pebble bed reactor providing for inherent passive stabilization in the event of damage.

2. Discussion of the Prior Art

High-temperature nuclear reactors with spheroid fuel elements are presently known. Different concepts have been developed with regard to the safety regulations in the event of encountered damage. For high-temperature nuclear reactors having a lower capacity there can be achieved an "inherent stabilization" in the event of encountered damage, which signifies that upon the failure of all active cooling systems and pressure release, there can be maintained a temperature of 1600° C. (which may not be exceeded in order to prevent release of the fission product) through natural heat removal. This requires a prerequisite capacity restriction for the single core to about 250 MW$_{th}$.

Consequently, there has been already been described a modified core type which incorporates an axial graphite column about which there are arranged spherical fuel elements in an approximately annular or ring-shaped configuration (refer to K. Peterson et al. "Efficiency of Inherent Protection Mechanisms for an Improved HTR Safety Concept", in a paper presented at the Specialists Meeting on Gas-cooled Reactor Safety and Licensing Aspects, Lausanne, Sept. 1–3, 1980). Such a high-temperature reactor with a ring-shaped core can be designed for a capacity of 350 MW$_{th}$ and higher; however, its construction is more complicated and the selection of the diameter of the center column must be met with great care, wherein there must also be considered that over lengthy periods of time there can be encountered problems of strength resulting from the continual influence of high neutron flux.

SUMMARY OF THE INVENTION

Accordingly, it is an object of the present invention to provide a simplification in the construction, particularly with respect to a predetermined capability to correlate with different power demands, as well as the preclusion of long-term stability problems in such a high-temperature reactor which has a central graphite core and a somewhat ring-shaped arrangement of fuel elements.

In order to achieve the foregoing object, the inventive high-temperature reactor of the above-mentioned type distinguishes itself in that the graphite core is formed by a pile or mass of graphite spheres.

Through the intermediary of such an axial graphite sphere region, the maximum temperature of the fuel elements of the core can be limited in the event of encountered damage in a manner similar to that as would be the case for a compact graphite column. However, in contrast with the last-mentioned, there is afforded the advantage that the construction becomes simpler and much more capable of being correlated due to the easy controllability of the graphite core which is formed by the spheres, which for the remainder can be constantly exchanged (particularly together with the fuel elements), so that there need no longer be feared any stability problems due to long-term influences of high-speed neutrons.

In the inventive reactor type, central graphite spheres are poured, simultaneously with the fuel elements, into the core, and will collect therein as a somewhat columnar core thus traversing the active region until they are again withdrawn together with the fuel element spheres at the lower end and are then again retrieved through a suitable sorting mechanism.

In this concept, the diameter of the graphite core is variable, and can be varied through a change in the hight of the sphere discharge above the mass of spheres and/or through a variation in the discharge rate of the graphite spheres. The resultingly imparted flexibility assists in the improvement of the reactor safety. Usually, the volumetric component of the graphite core in the total core lies in the vicinity of about 5 to 10%.

For the remainder, the inventive modification of the known reactor requires no extensive changes of the overall concept, for example, as can be ascertained from the Technical Report ITB 78.2634.1 of the GHT, dated Oct. 1, 1981.

In addition to the graphite core, such a reactor having fuel elements which are arranged substantially ring-shaped, in a manner known per se, can include graphite ledges or projections protruding from exteriorly into the fuel element ring, and which provide for a further conduction away of the after-heat and additional regulating capabilities (within the projections).

Preferably, these projections serve concurrently for a securing of the ceiling blocks of the ceiling reflector, and they then extend to about the bottom side of the ceiling reflector. Suitably, there are provided six projections which protrude into the ring and which, in the instance of a block segment of the ceiling reflector falling off in the event of damage, can readily catch the block.

The inventive reactor with the axial graphite core formed of graphite spheres is streamed through entirely by cooling gas, and there is obtained, with consideration being given to the axial power sink, a relatively cold axial flow (whose component is, above all, low and lies at about 5%) and which is encompassed by a hotter annular flow. At a downwardly directed gas flow, one can now discharge the axial "cold gas" separately through the sphere discharge conduit at the lower end which, in any event, requires a predetermined cooling gas flow or, alternatively, means (such as means which can be provided for a multiple redirecting of the flow in the discharge conduits proximate to the axis), for the generating of a turbulent flow in the gas discharge region, can be provided which lead to an admixing of the axial and coaxial partial flows. Naturally, it is possible to apply both measures concurrently.

At an upwardly directed gas flow, the axial "cold gas" can be discharged separately towards a blower through an outlet in the middle of the ceiling reflector. The (remaining) gas flow can in this instance, as required, be additionally mixed through suitable means for the generating of a turbulent flow in the ceiling reflector.

BRIEF DESCRIPTION OF THE DRAWINGS

Reference may now be had to the following detailed description of the invention, taken in conjunction with a diagrammatic representation of the inventive reactor concept as illustrated in the accompanying drawings; in which.

DETAILED DESCRIPTION

Figure 1:
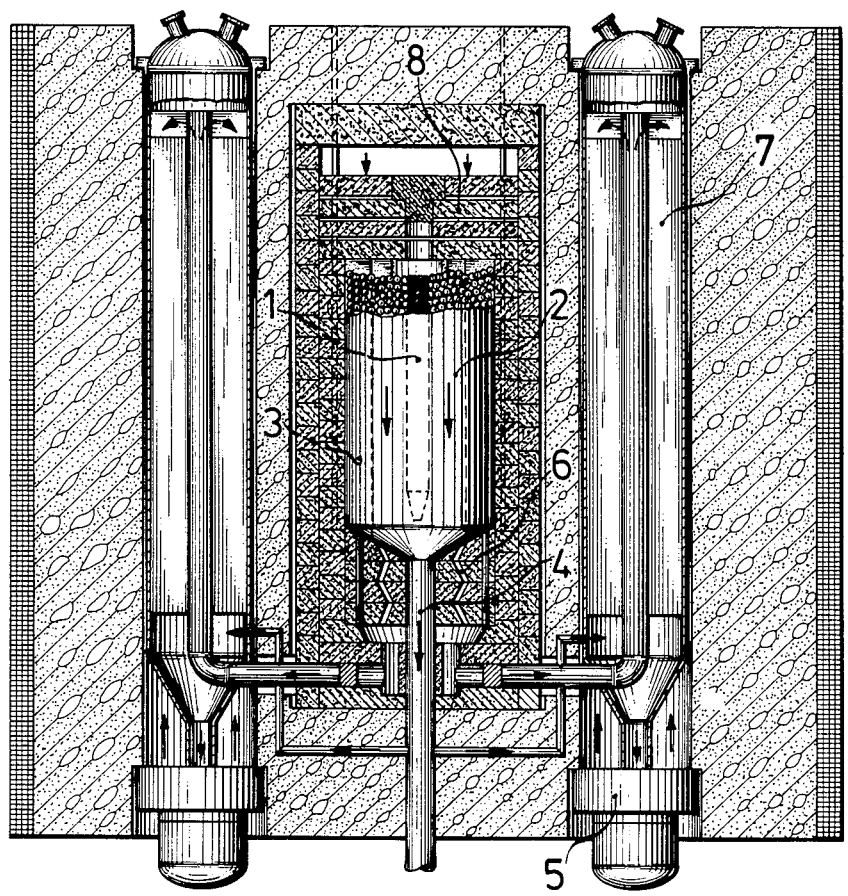
FIG. 1 illustrates a longitudinal axial sectional view through the core region of a reactor which provides for a downwardly directed gas flow.

Pursuant to FIG. 1 of the drawings, the core of the reactor encompasses a graphite core 1 which consists of graphite spheres, and which is encompassed by a ring 2 of fuel elements into which there protrude the graphite projections 3. The axial cooling gas passes through the discharge conduit for the spheres 4 directly to the blower 5, whereas the hotter gas flows from the ring-shaped region through conduits or passageways 6 into the steam generator 7.

Figure 2:
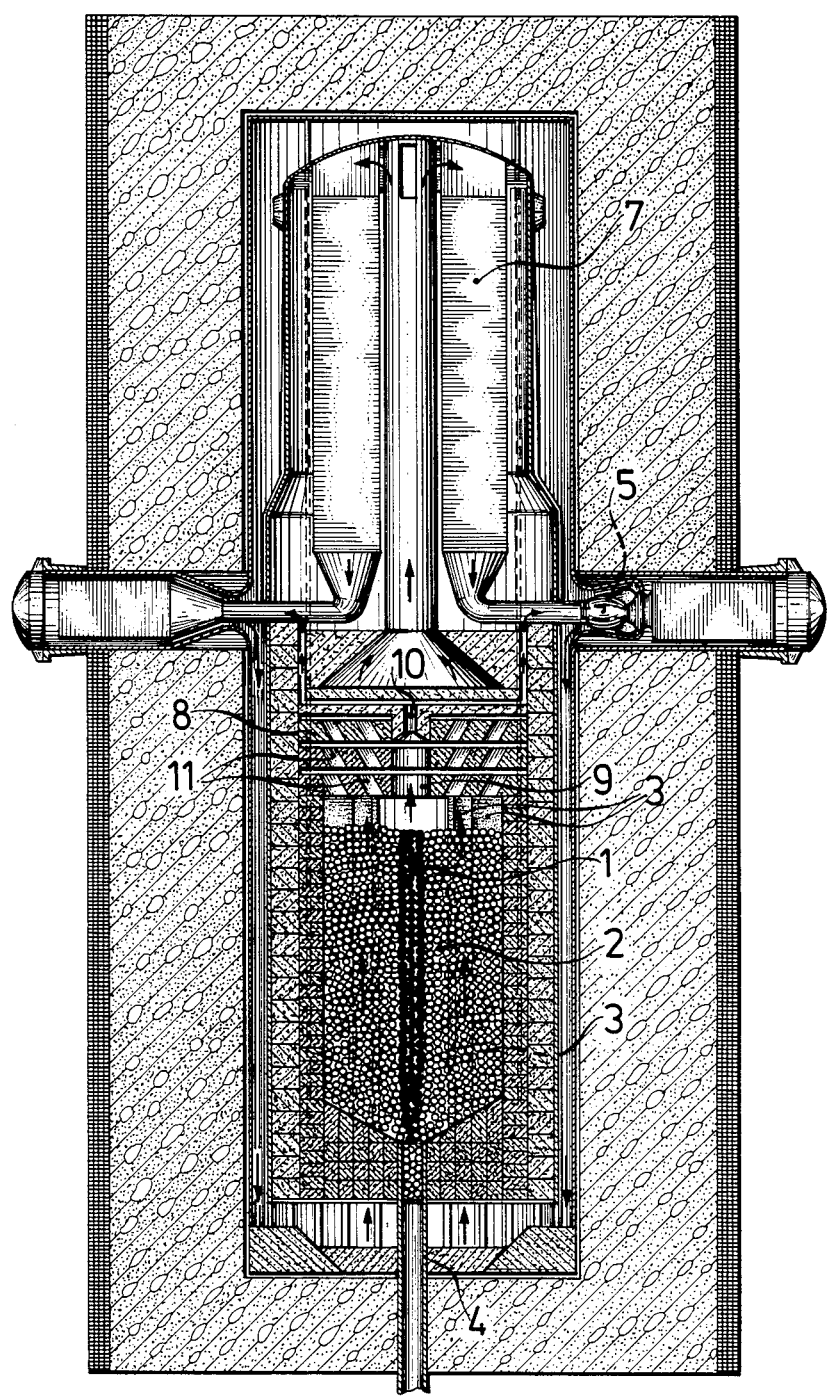
FIG. 2 illustrates a sectional view similar to FIG. 1 through the core region of a reactor which provides for an upwardly directed gas flow.

In the arrangement illustrated in FIG. 2 of the drawings, cooling gas flows upwardly through the core. The colder axial gas flow passes directly through an opening 9 provided in the ceiling reflector 8 (at times including a restriction 10) to the blowers 5, whereas the remaining gas flows through offset outlets 11 (with corresponding mixing effect) to the steam generators. At times, if desired, regulating capabilities for the axial flow can be provided above the reflector.

Figure 3:
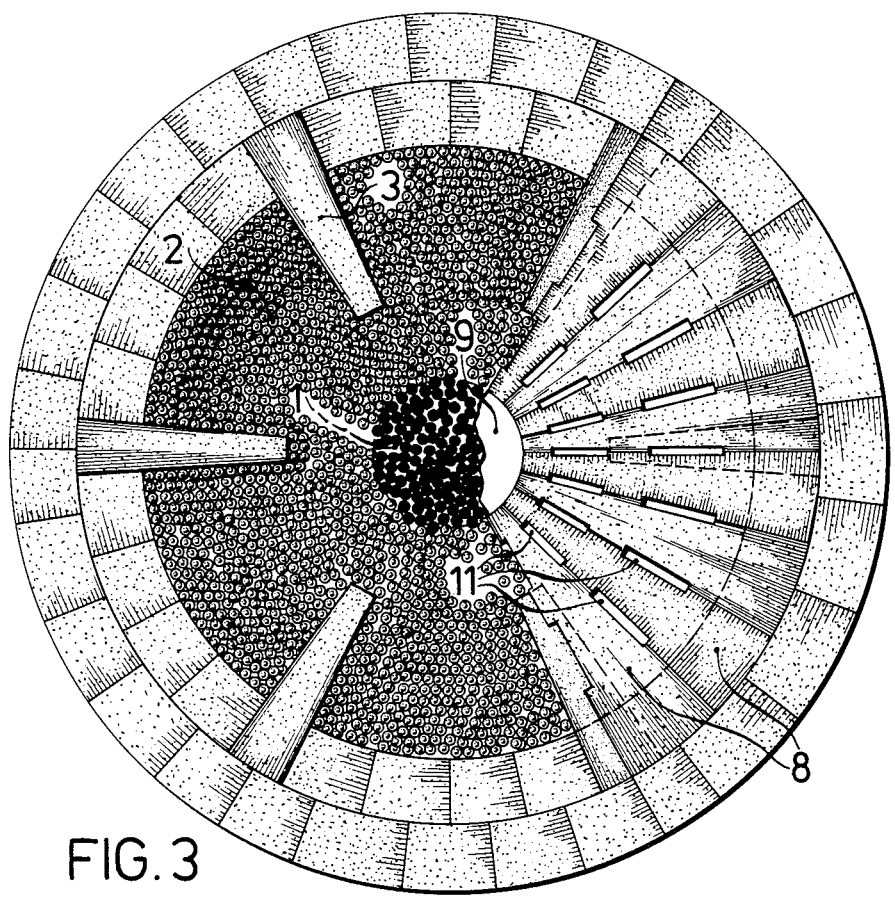
FIG. 3 illustrates a sectional view through the core and reflector perpendicular to the axis thereof with a partial plan view of the ceiling reflector.

FIG. 3 illustrates six radial graphite ledges or projections 3, which protrude into the ring-shaped region 2, which is assumed by the fuel elements, which coaxially encompass the graphite core formed by spheres. In the right-hand third of this drawing figure there can recognized the axial opening 9 and the outlets 11 of the ceiling reflector.

Figure 4:
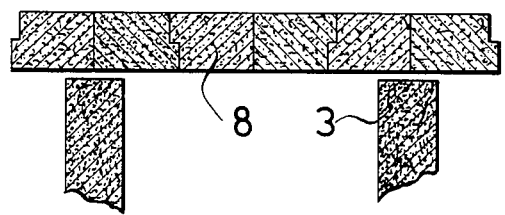
FIG. 4 illustrates the support for the ceiling blocks.

The six graphite projections 3, as is indicated in FIG. 4, support the twenty-four ceiling blocks of the ceiling reflector 8.

A reactor of the herein-described type with an axial core of graphite spheres and six graphite projections can be designed for capacities of 500 to 600 MW$_{th}$.

What is claimed is:

1. In a high-temperature nuclear reactor having a ring-shaped arrangement of spherical fuel elements surrounding an axial graphite column; the improvement comprising said graphite column formed from a mass of graphite spheres, a discharge for introducing said graphite spheres into said reactor arranged at a variable distance from the mass of graphite spheres, and means for varying the discharge rate of said graphite spheres into said reactor, said variable distance of said discharge and said means being varied in a manner effective to provide variation in the graphite column diameter.

2. Nuclear reactor as claimed in claim 1, comprising a plurality of graphite projections protruding from a reflector into the fuel element ring, said projections extending approximately to the ceiling reflector and being adapted to support blocks of the ceiling reflector.

3. Nuclear reactor as claimed in claim 2, comprising a separate axial discharge for cooling gas through the sphere discharge conduit, an axial outlet in the ceiling reflector and means for generating turbulent flows in the gas discharge region for admixing the partial axial and coaxial flows.

* * * * *